United States Patent
Watanabe et al.

(10) Patent No.: US 10,634,254 B2
(45) Date of Patent: *Apr. 28, 2020

(54) SEAL RING

(71) Applicant: NOK CORPORATION, Tokyo (JP)

(72) Inventors: Koji Watanabe, Kitaibaraki (JP); Kazunari Seki, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/895,100

(22) PCT Filed: May 26, 2014

(86) PCT No.: PCT/JP2014/063870
§ 371 (c)(1),
(2) Date: Dec. 1, 2015

(87) PCT Pub. No.: WO2014/196403
PCT Pub. Date: Dec. 11, 2014

(65) Prior Publication Data
US 2016/0116066 A1   Apr. 28, 2016

(30) Foreign Application Priority Data

Jun. 3, 2013 (JP) .................. 2013-117268
Aug. 23, 2013 (JP) .................. 2013-173511

(51) Int. Cl.
F16J 15/16 (2006.01)
F16J 15/44 (2006.01)
F16J 9/14 (2006.01)

(52) U.S. Cl.
CPC ............... *F16J 15/164* (2013.01); *F16J 9/14* (2013.01); *F16J 15/441* (2013.01); *F16J 15/443* (2013.01)

(58) Field of Classification Search
CPC ........................................... F16J 9/14
(Continued)

(56) References Cited

U.S. PATENT DOCUMENTS 1,413,031 A * 4/1922 Kapuczin .................. F16J 9/14
                                                277/446
2,423,017 A   6/1947 Grant
(Continued)

FOREIGN PATENT DOCUMENTS

EP    1293302 A2   3/2003
EP    2423542 A1   2/2012
(Continued)

OTHER PUBLICATIONS

Extended European search report dated Jan. 12, 2017.
(Continued)

*Primary Examiner* — Vishal A Patel
*Assistant Examiner* — Thomas L Neubauer
(74) *Attorney, Agent, or Firm* — Harness, Dickey & Pierce, P.L.C.

(57) ABSTRACT

A seal ring (100) makes contact with a low-pressure-side (L) side wall surface of an annular groove (510) and slides against an inner circumferential surface of a shaft hole of a housing (600) through which a shaft (500) is inserted. The seal ring includes a pair of recessed portions (130) extending in a circumferential direction on an outer surface, wherein a distance between a side surface on one side of a protruding portion (120) that is disposed between the pair of recessed portions (130) and a side surface on another side of the seal ring (100), and a distance between a side surface on another side of the protruding portion (120) and a side surface on one side of the seal ring (100) are set to be shorter than a distance
(Continued)

between an inner circumferential surface of the seal ring and an outer circumferential surface of the protruding portion (120).

2 Claims, 9 Drawing Sheets

(58) Field of Classification Search
USPC .................................................. 277/216–222
See application file for complete search history.

(56) References Cited

U.S. PATENT DOCUMENTS

| | | | | |
|---|---|---|---|---|
| 4,557,488 A * | 12/1985 | Litherland | ............... | E21D 15/44 |
| | | | | 277/461 |
| 5,066,027 A | 11/1991 | Edlund | | |
| 5,632,494 A | 5/1997 | Oka | | |
| 6,592,337 B2 * | 7/2003 | Yamada | ............... | F16J 15/3232 |
| | | | | 277/549 |
| 6,685,193 B2 * | 2/2004 | Roberts | ............... | B25C 1/08 |
| | | | | 277/459 |
| 8,585,059 B2 * | 11/2013 | Maeda | ............... | F16J 15/3208 |
| | | | | 277/399 |
| 9,239,113 B2 * | 1/2016 | Nagai | ............... | F16J 15/441 |
| 9,303,767 B2 * | 4/2016 | Watanabe | ............... | F16J 15/164 |
| 9,316,316 B2 * | 4/2016 | Kuroki | ............... | F16J 15/30 |
| 10,359,114 B2 * | 7/2019 | Seki | ............... | F16J 15/164 |
| 2003/0042686 A1 * | 3/2003 | Roberts | ............... | B25C 1/08 |
| | | | | 277/434 |

FOREIGN PATENT DOCUMENTS

| | | | | |
|---|---|---|---|---|
| FR | 769038 A | | 8/1934 | |
| JP | S55-090852 U | | 6/1980 | |
| JP | H01203766 A | | 8/1989 | |
| JP | H0293169 A | | 4/1990 | |
| JP | H05-001071 U | | 1/1993 | |
| JP | H08219292 A | | 8/1996 | |
| JP | H10169782 | * | 12/1996 | ............... F16J 15/18 |
| JP | H10169782 A | | 6/1998 | |
| JP | H10203766 A | | 8/1998 | |
| JP | H10318375 A | | 12/1998 | |
| JP | 2004-301236 A | | 10/2004 | |
| JP | 2006-308066 A | | 11/2006 | |
| JP | 4872152 B2 | | 2/2012 | |
| JP | WO2014103446 | * | 9/2013 | ............... F16J 15/30 |
| WO | 2014-030506 A1 | | 2/2014 | |

OTHER PUBLICATIONS

Japanese Office Action dated Apr. 24, 2018 with English translation (corresponding to JP2017-115097).
Japanese Office Action dated Oct. 23, 2018 with English translation (corresponding to JP 2017-115097).

* cited by examiner

SEAL RING

CROSS-REFERENCE TO RELATED APPLICATIONS

This application is a National Stage of International Application No. PCT/JP2014/063870, filed May 26, 2014 (now WO 2014/196403A1), which claims priority to Japanese Application No. 2013-117268, filed Jun. 3, 2013 and Japanese Application No. 2013-173511, filed Aug. 23, 2013. The entire disclosures of each of the above applications are incorporated herein by reference.

FIELD

The present disclosure relates to a seal ring for sealing an annular gap between a shaft and a shaft hole of a housing.

BACKGROUND

A seal ring for sealing an annular gap between a shaft and a housing that rotate relative to each other is provided in an automatic transmission (AT) or a continuously variable transmission (CVT) of an automobile in order to keep the hydraulic pressure. In recent years, amidst an attempt to lower fuel consumption to cope with the environmental challenges, there has been an increasing demand for reducing the rotational torque of such seal rings. Therefore, conventionally, there has been a countermeasure taken to reduce the contact area of the sliding portions between a side surface of an annular groove in which a seal ring is mounted and the seal ring. The seal ring according to this conventional example is now described with reference to FIG. 19.

FIG. 19 is a schematic cross-sectional diagram illustrating the seal ring according to the conventional example in use. The seal ring 300 according to the conventional example is mounted in an annular groove 510 provided on the outer circumference of a shaft 500. The seal ring 300 is making intimate contact with an inner circumferential surface of a shaft hole of a housing 600 through which the shaft 500 is inserted, and is slidably in contact with a side wall surface of the annular groove 510, thereby sealing the annular gap between the shaft 500 and the shaft hole of the housing 600.

The seal ring 300 according to the conventional example is provided with a pair of recessed portions 320 extending in a circumferential direction on inner circumferential side of both side surfaces. For this reason, an effective pressure-receiving region of when the seal ring 300 is pressed by a fluid to be sealed from a high-pressure-side (H) toward a low-pressure-side (L) in an axial direction is a region shown by "A" in FIG. 19. In other words, of the side surface of the seal ring 300, a radial region of a portion 310 where the recessed portion 320 is not formed corresponds to the effective pressure-receiving region A. This is because, within a region provided with the recessed portions 320, the fluid pressure acts from either side in the axial direction thereby offsetting the forces applied to the seal ring 300 in the axial direction. Note that the area over the entire circumference of the pressure-receiving region A is the effective pressure-receiving area with respect to the axial direction.

Further, an effective pressure-receiving region of when the seal ring 300 is pressed radially outward by the fluid to be sealed from an inner circumferential surface side toward an outer circumferential surface side is a region shown by "B" in FIG. 19. In other words, the thickness of the seal ring 300 in the axial direction corresponds to the effective pressure-receiving region B. Note that the area over the entire circumference of the pressure-receiving region B is the pressure-receiving area with respect to the radial direction.

As described above, by setting the relationship [length of region A]<[length of region B], it becomes possible to cause the seal ring 300 and the side wall surface of the annular groove 510 to slide against each other. In addition, the rotational torque can be reduced by making the length of the pressure-receiving region A as short as possible.

However, the contact region of the seal ring 300 against the side wall surface of the annular groove 510 is a region shown by "C" in FIG. 19. In other words, of a side surface of the seal ring 300 on the low-pressure-side (L), and of the portion 310 where the recessed portion 320 is not formed, only the part excepting the part exposed to the gap between the shaft 500 and the housing 600 comes into contact with the side wall surface of the annular groove 510. Accordingly, the contact region C of the seal ring 300 is affected by the size of the gap between the shaft 500 and the housing 600. Therefore, depending on the usage environment, the area of contact between the side wall surface of the annular groove 510 and the seal ring 300 may become excessively small, resulting in a degradation of the sealing performance of the seal ring 300. In addition, depending on the usage environment, the contact region may vary continually, resulting in an unstable sealing performance.

CITATION LIST

Patent Literature

Patent Literature 1: Japanese Patent Application Laid-open No. 08-219292
Patent Literature 2: Japanese Patent No. 4872152

SUMMARY TECHNICAL PROBLEM

An object of the present disclosure is to provide a seal ring that is designed to achieve a stable sealing performance while reducing the rotational torque.

Solution to Problem

The present disclosure employs the following means to accomplish the foregoing object.

That is, a seal ring according to the present disclosure is a seal ring that is mounted in an annular groove provided on an outer circumference of a shaft and seals an annular gap between the shaft and a housing that rotate relative to each other to keep fluid pressure in a region to be sealed that is configured such that the fluid pressure therein changes, the seal ring making intimate contact with a low-pressure-side side wall surface of the annular groove and sliding against an inner circumferential surface of a shaft hole of the housing through which the shaft is inserted, wherein, on an outer circumferential surface side of the seal ring, a pair of recessed portions extending in a circumferential direction is provided on either side in a width direction, a distance between a side surface on one side of a protruding portion that is disposed between the pair of recessed portions, and a side surface on another side of the seal ring, and a distance between a side surface on another side of the protruding portion and a side surface on one side of the seal ring are set to be shorter than a distance between an inner circumferential surface of the seal ring and an outer circumferential surface of the protruding portion, thereby configuring an effective pressure-receiving area on an inner circumferential surface side that contributes to a force from the fluid pressure that presses against the inner circumferential surface of the shaft hole to become smaller than an effective pressure-receiving area on a side surface side that contributes to a force from the fluid pressure that presses against the low-pressure-side side wall surface of the annular groove.

A seal ring according to another disclosure is a seal ring that is mounted in an annular groove provided on an outer circumference of a shaft and seals an annular gap between the shaft and a housing that rotate relative to each other to keep fluid pressure in a region to be sealed that is configured such that the fluid pressure therein changes, the seal ring making intimate contact with a low-pressure-side side wall surface of the annular groove and sliding against an inner circumferential surface of a shaft hole of the housing through which the shaft is inserted, wherein the seal ring has, on an outer circumferential surface side of the seal ring, a recessed portion provided at a center in a width direction and extending in a circumferential direction; and a pair of protruding portions provided on either side of the recessed portion and sliding against the inner circumferential surface of the shaft hole, the seal ring further has, a through-hole that extends from an inner circumferential surface side to a bottom surface of the recessed portion and is capable of introducing a fluid to be sealed from the inner circumferential surface side to the recessed portion, thereby configuring an effective pressure-receiving area on an inner circumferential surface side that contributes to a force from the fluid pressure that presses against the inner circumferential surface of the shaft hole to become smaller than an effective pressure-receiving area on a side surface side that contributes to a force from the fluid pressure that presses against the low-pressure-side side wall surface of the annular groove.

Furthermore, a seal ring according to yet another disclosure is a seal ring that is mounted in an annular groove provided on an outer circumference of a shaft and seals an annular gap between the shaft and a housing that rotate relative to each other to keep fluid pressure in a region to be sealed that is configured such that the fluid pressure therein changes, the seal ring making intimate contact with a low-pressure-side side wall surface of the annular groove and sliding against an inner circumferential surface of a shaft hole of the housing through which the shaft is inserted, wherein a portion of the seal ring that slides against the inner circumferential surface of the shaft hole is configured from a protruding portion that extends in a circumferential direction while alternating its position between a high-pressure-side and a low-pressure-side, thereby configuring an effective pressure-receiving area on an inner circumferential surface side that contributes to a force from the fluid pressure that presses against the inner circumferential surface of the shaft hole to become smaller than an effective pressure-receiving area on a side surface side that contributes to a force from the fluid pressure that presses against the low-pressure-side side wall surface of the annular groove.

According to these disclosures, an outer circumferential surface of the protruding portion of the seal ring can be caused to slide against the inner circumferential surface of the shaft hole more securely. For this reason, an area of the sliding portion can be made stable regardless of the size of the annular gap between the shaft and the housing. Therefore, sealing performance of the seal ring can be stabilized. In addition, by causing the protruding portion on the outer circumferential surface of the seal ring to slide more securely, the sliding resistance can be reduced, thereby reducing the rotational torque.

ADVANTAGEOUS EFFECTS OF THE DISCLOSURE

As described above, according to the present disclosure, it becomes possible to achieve a stable sealing performance while reducing the rotational torque.

DRAWINGS

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described. Note that the seal rings according to the examples are used in a transmission of an automobile, such as an AT or CVT, for the purpose of sealing an annular gap between a shaft and a housing that rotate relative to each other, to keep the hydraulic pressure. In the following description, the term "high-pressure-side" denotes the side where the pressure becomes high when a differential pressure is created between the two sides separated by the seal ring, and the term "low-pressure-side" denotes the side where the pressure becomes low when the differential pressure is created between the two sides separated by the seal ring.

Example 1

A seal ring according to Example 1 of the present disclosure is described with reference to FIGS. 1 to 4.
<Configuration of Seal Ring>

Figure 1:
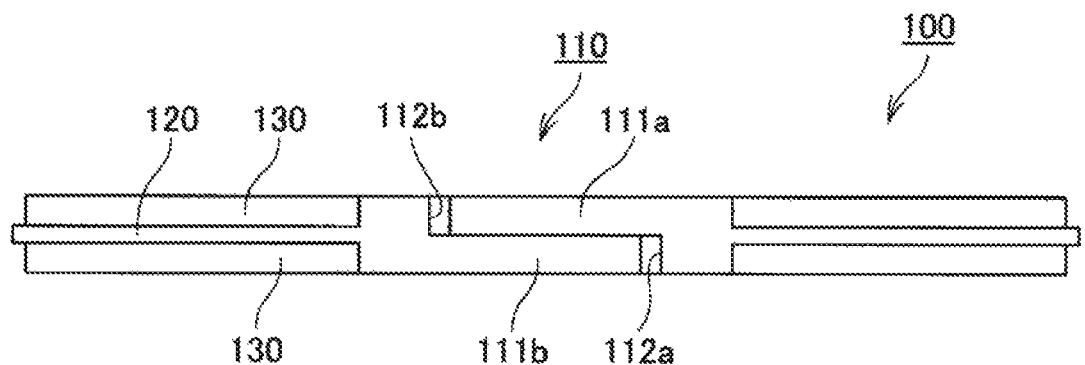
FIG. 1 is a diagram illustrating a seal ring according to Example 1 of the present disclosure from its outer circumferential surface side.
Figure 2:
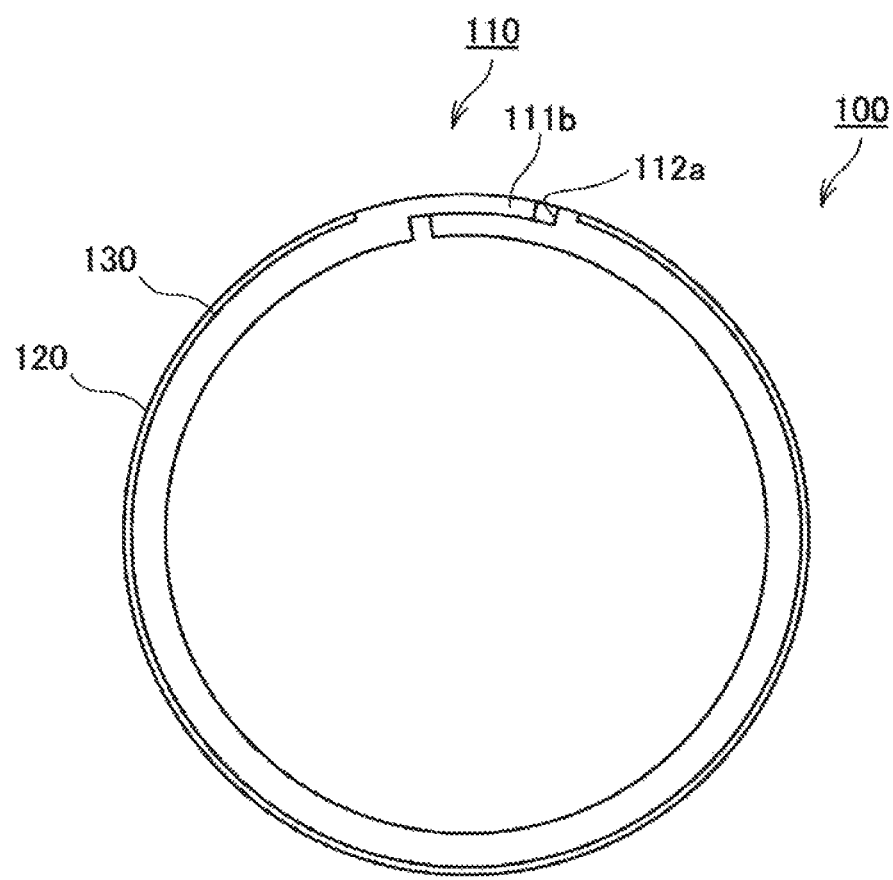
FIG. 2 is a side view of the seal ring according to Example 1 of the present disclosure.
Figure 3:
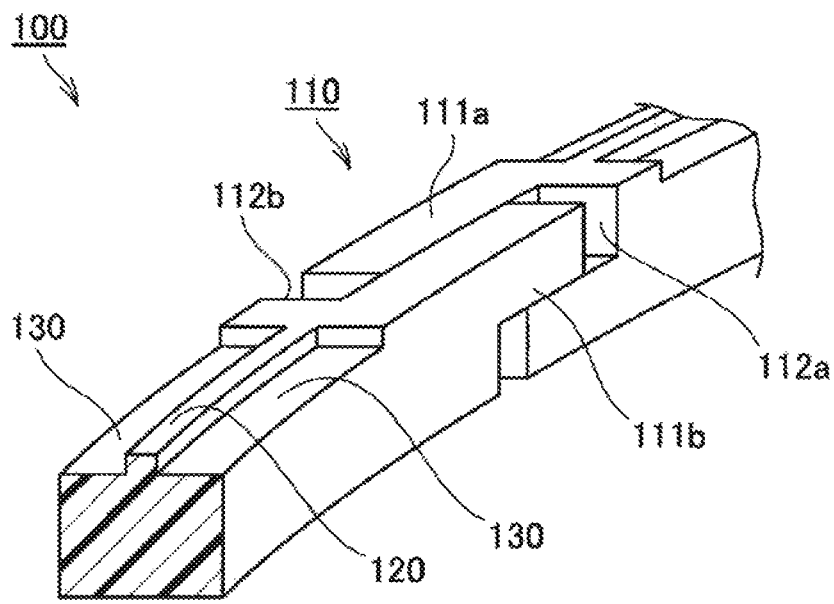
FIG. 3 is a partially broken perspective view of the seal ring according to Example 1 of the present disclosure.
Figure 4:
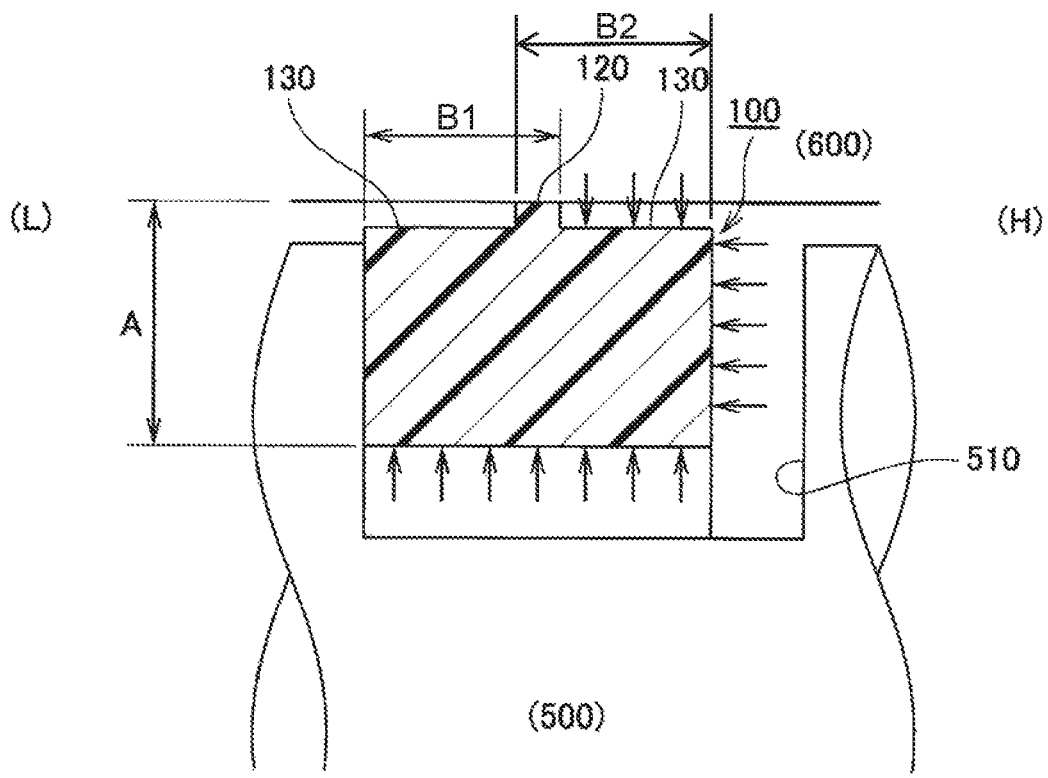
FIG. 4 is a schematic cross-sectional diagram illustrating the seal ring according to Example 1 of the present disclosure in use.

A seal ring 100 according to the present example is mounted in an annular groove 510 provided on an outer circumference of a shaft 500, to seal an annular gap between the shaft 500 and a housing 600 (an inner circumferential surface of a shaft hole of the housing 600 through which the shaft 500 is inserted) that rotate relative to each other. Such configuration enables the seal ring 100 to keep fluid pressure (hydraulic pressure, in the present example) in a region to be sealed that is configured such that the fluid pressure therein changes. In the present example, the fluid pressure in the region on the right side of FIG. 4 is configured to change, and the seal ring 100 functions to keep the fluid pressure of the region to be sealed on the right side of the diagram. Note that the fluid pressure in the region to be sealed is low when an engine of an automobile is stopped, and hence no force is applied, whereas the fluid pressure in the region to be sealed becomes high when the engine is started.

The seal ring 100 is made of resin such as polyetheretherketone (PEEK), polyphenylene sulfide (PPS), or polytetrafluoroethylene (PTFE). The perimeter of the outer circumferential surface of the seal ring 100 is shorter than the perimeter of the inner circumferential surface of the shaft hole of the housing 600; hence the seal ring 100 has no interference.

This seal ring 100 has an abutment joint portion 110 at one location in the circumferential direction of the seal ring 100. In addition, on the outer circumferential surface of the seal ring 100, a pair of recessed portions 130 extending in a circumferential direction is provided on either side in a width direction. Note that, a protruding portion 120 is provided between the pair of recessed portions 130 that slides against the inner circumferential surface of the shaft hole of the housing 600. A bottom surface of each the pair of recessed portions 130 is configured from a surface that is concentric to the inner circumferential surface of the seal ring 100. Side surfaces of the protruding portion 120 are configured to be perpendicular to the bottom surfaces of the recessed portions 130.

Note that, the seal ring 100 according to the present example employs a configuration in which the abutment joint portion 110, the pair of recessed portions 130 and the protruding portion 120 obtained by forming the pair of recessed portions 130 are formed on an annular member having a rectangular cross section. However, this is merely a description of the shape of the seal ring 100, and thus this does not indicate that processes to form each of these portions are applied to a raw annular member having a rectangular cross section. Needless to say, each of these portions can be obtained by machining after forming an annular member having a rectangular cross section. However, the recessed portions 130 may be obtained by, for example, machining after forming an annular member having an abutment joint portion 110 in advance; hence, a manufacturing process is not particularly limited.

The abutment joint portion 110 employs a so-called "special step cut" in which the abutment joint portion 110 is cut into steps as viewed from any of the outer circumferential surface side and both of the wall surface sides. Accordingly, in the seal ring 100, a first engagement raised portion 111a and a first engagement depressed portion 112a are provided on an outer circumferential side of one of two sides separated by a cut section, and a second engagement depressed portion 112b, with which the first engagement raised portion 111a engages, and a second engagement raised portion 111b, which engages with the first engagement depressed portion 112a, are provided on an outer circumferential side of another of the two sides. As the special step cut is a well-known technique, its detailed description is omitted, nonetheless it is characterized in maintaining stable sealing performance even when the perimeter of the seal ring 100 is changed as a result of thermal expansion or contraction. Although the special step cut is described here as an example of the abutment joint portion 110, the abutment joint portion 110 is not limited to this, and thus a straight cut, a bias cut, a step cut or the like can be employed as well. Note that in a case where a low-elasticity material (such as PTFE) is used as the material of the seal ring 100, the seal ring 100 may be configured into an endless ring without forming an abutment joint portion 110.

The pair of recessed portions 130 is formed over the entire circumference of the seal ring 100, except for the vicinity of the abutment joint portion 110. A section near the abutment joint portion 110 where the recessed portions 130 are not provided is flush with the outer circumferential surface of the protruding portion 120. These surfaces form an annular, continuous sealing surface on the outer circumferential surface side of the seal ring 100. In other words, in the region on the outer circumferential surface of the seal ring 100 except for the vicinity of the abutment joint portion 110, only the outer circumferential surface of the protruding portion 120 slides against the inner circumferential surface of the shaft hole. Note that in a case where a configuration is employed in which an abutment joint portion 110 is not provided, a protruding portion 120 can be made annular by forming a pair of recessed portions 130 into an annular shape. Accordingly, an annular, continuous sealing surface can be formed with only the outer circumferential surface of the protruding portion 120.

With respect to the width of the protruding portion 120, the narrower it is, the lower the torque can be made, but if the width is made too narrow, its sealing performance and durability may decrease. Therefore, it is desired that the width be made as narrow as possible to keep the sealing performance and durability, in accordance with the usage environment. Note that, when the entire lateral width of the seal ring 100 is 1.9 mm, for example, the width of the protruding portion 120 may be set, approximately, between 0.3 mm and 0.7 mm, inclusive.

In the seal ring 100 according to the present example, the distance B1 between a side surface on one side of the protruding portion 120 and a side surface on another side of the seal ring 100 (equivalent to length of region B1), and the distance B2 between a side surface on another side of the protruding portion 120 and a side surface on one side of the seal ring 100 are made shorter than the distance A between the inner circumferential surface of the seal ring 100 and the outer circumferential surface of the protruding portion 120 (equivalent to length of region A) (see FIG. 4). Note that the distance between the side surface of the protruding portion 120 on the one side and the side surface of the seal ring 100 on the other side is equal to the distance between the side surface of the protruding portion 120 on the other side and the side surface of the seal ring 100 on the one side. It can also be said that the region B is a region between a high-pressure-side (H) side surface of the protruding portion 120 and a low-pressure-side (L) side surface of the seal ring 100 when the seal ring 100 is in use (see FIG. 4).

By setting the relationship between the region A and the region B as described above, the seal ring 100 can be configured such that the effective pressure-receiving area on its inner circumferential surface side that contributes to a force from the fluid pressure that presses against the inner circumferential surface of the shaft hole becomes smaller than the effective pressure-receiving area on its side surface side that contributes to a force from the fluid pressure that presses against the low-pressure-side side wall surface of the annular groove 510.

<Mechanism of Seal Ring in Use>

The mechanism of the seal ring 100 in use according to the present example is now described with reference in particular to FIG. 4. FIG. 4 shows a state in which the engine is started and a differential pressure is created through the seal ring 100 (a state in which the pressure on the right side of the diagram is higher than the pressure on the left side of the diagram).

In a no-load state, there is no differential pressure between the left and right regions, and the fluid pressure from the inner circumferential surface does not act. Therefore, the seal ring 100 is separated from the side wall surface of the annular groove 510 on the left side of FIG. 4 and the inner circumferential surface of the shaft hole.

When the engine is started and a differential pressure is generated, the seal ring 100 makes intimate contact with the low-pressure-side (L) side wall surface of the annular groove 510 and slides against the inner circumferential surface of the shaft hole (see FIG. 4).

<Advantages of Seal Ring According to Present Example>

In the seal ring 100 according to the present example, when the differential pressure is created between the two sides separated by the seal ring 100, the fluid to be sealed is introduced into the recessed portion 130 on the high-pressure-side (H) among the pair of recessed portions 130. Accordingly, even when the fluid pressure becomes high, the fluid pressure in the region provided with this recessed portion 130 acts toward the inner circumferential side. In the present example, because the bottom surface of the recessed portion 130 is configured from the surface that is concentric to the inner circumferential surface of the seal ring 100, the direction in which the fluid pressure acts from the inner circumferential surface side is opposite to the direction in which the fluid pressure acts from the outer circumferential surface side within the region provided with the high-pressure-side (H) recessed portion 130. Note that the arrows shown in FIG. 4 represent how the fluid pressure acts on the seal ring 100. For this reason, in the seal ring 100 according to the present example, it becomes possible to suppress an increase of the pressure towards the outer circumferential side of the seal ring 100 due to the increase of the fluid pressure; and hence the sliding torque can be maintained low.

In the seal ring 100 according to the present example, the length of the region B shown in FIG. 4 is set to be shorter than that of the region A. For this reason, as described above, the seal ring 100 can be configured such that the effective pressure-receiving area on its inner circumferential surface side that contributes to a force from the fluid pressure that presses against the inner circumferential surface of the shaft hole becomes smaller than the effective pressure-receiving area on its side surface side that contributes to a force from the fluid pressure that presses against the low-pressure-side side wall surface of the annular groove 510.

Specifically, the region A is the effective pressure-receiving region of when the seal ring 100 is pressed by the fluid to be sealed from the high-pressure-side (H) toward the low-pressure-side (L) in the axial direction. In addition, the area over the entire circumference of the pressure-receiving region A is the effective pressure-receiving area with respect to the axial direction. Furthermore, the region B is the effective pressure-receiving region of when the seal ring 100 is pressed radially outward by the fluid to be sealed from the inner circumferential surface side toward the outer circumferential surface side. This is because, within the region provided with the recessed portion 130, the fluid pressure acts from either side of the radial direction, thereby offsetting the forces being applied to the seal ring 100 in the radial direction, as described above. Note that the area over the entire circumference of the pressure-receiving region B is the effective pressure-receiving area with respect to the radial direction.

Therefore, when a differential pressure is created between the two sides of the seal ring 100, in terms of the effective pressure-receiving region (pressure-receiving area) with respect to the seal ring 100, that of in the radially outward direction is smaller than that of in the axial direction. Accordingly, the outer circumferential surface of the protruding portion 120 of the seal ring 100 can be caused to slide against the inner circumferential surface of the shaft hole more securely. For this reason, the area of the sliding portion can be made stable regardless of the size of the annular gap between the shaft 500 and the housing 600. Therefore, the sealing performance of the seal ring 100 can be stabilized. In addition, by causing the protruding portion 120 on the outer circumferential surface of the seal ring 100 to slide more securely, the sliding resistance can be reduced, thereby reducing the rotational torque. Moreover, because the outer circumferential surface side of the seal ring 100 slides, a lubricating film (an oil film, in this case) can be created more easily by the fluid to be sealed compared with a seal ring that slides against a side wall surface of an annular groove resulting in further reduction of the sliding torque. This is because, in the case where the outer circumferential surface of the seal ring 100 and the inner circumferential surface of the shaft hole slide against each other, a wedge effect can be exerted in a minute space therebetween.

In addition, according to the present example, the pair of recessed portions 130 is formed over the entire circumference of the seal ring 100, except for the vicinity of the abutment joint portion 110. Therefore, in the present example, as the recessed portions 130 are formed over a wide range of the outer circumferential surface of the seal ring 100, it becomes possible to make the sliding area between the seal ring 100 and the inner circumferential surface of the shaft hole of the housing 600 as narrow as possible, thereby making the sliding torque extremely low.

As described above, because the reduction of the sliding torque can be realized, generation of heat due to the sliding can be suppressed; and hence it becomes possible to appropriately use the seal ring 100 according to the present example even under a high-speed, high-pressure environment. In addition, since the seal ring 100 does not slide against the side surface of the annular groove 510, the shaft 500 can be made of a soft material such as aluminum.

Moreover, because the seal ring 100 according to the present example is plane-symmetrical with respect to the width-wise center plane, there is no need to care about the mounting direction when mounting the seal ring 100 into the annular groove 510. In addition, even in an environment where the high-pressure-side (H) and the low-pressure-side (L) alternate, above described advantageous effects can be exerted.

Note that, in the present example, that the side surfaces of the protruding portion 120 are configured to be perpendicular to the bottom surfaces of the recessed portions 130. Note that, the side surfaces of the protruding portion 120 can be formed from inclined surfaces, such as tapered surfaces, so that the width of the protruding portion 120 becomes narrower toward the outer circumferential surface side. However, if the side surfaces of the protruding portion 120 are formed from inclined surfaces, there is a possibility that the fluid to be sealed is blown out through the gap between the outer circumferential surface of the protruding portion 120 and the inner circumferential surface of the shaft hole when the differential pressure is created suddenly. It is therefore desired that the side surfaces of the protruding portion 120 be perpendicular to the bottom surfaces of the recessed portions 130.

Example 2

Figure 5:
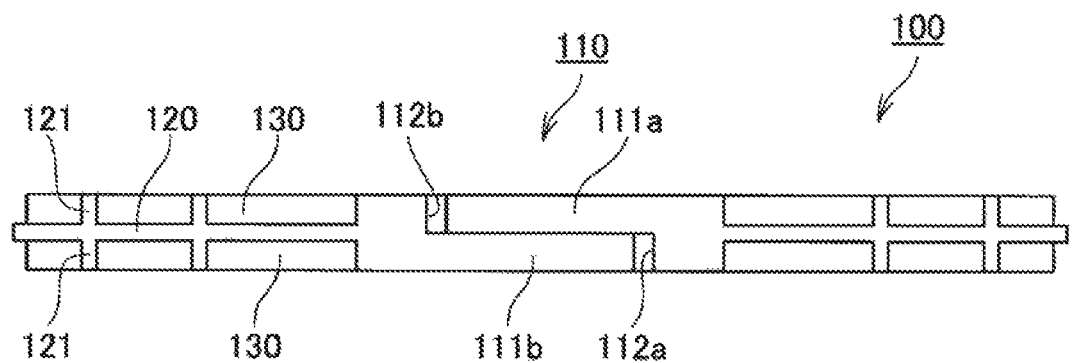
FIG. 5 is a diagram illustrating a seal ring according to Example 2 of the present disclosure from its outer circumferential surface side.
Figure 6:
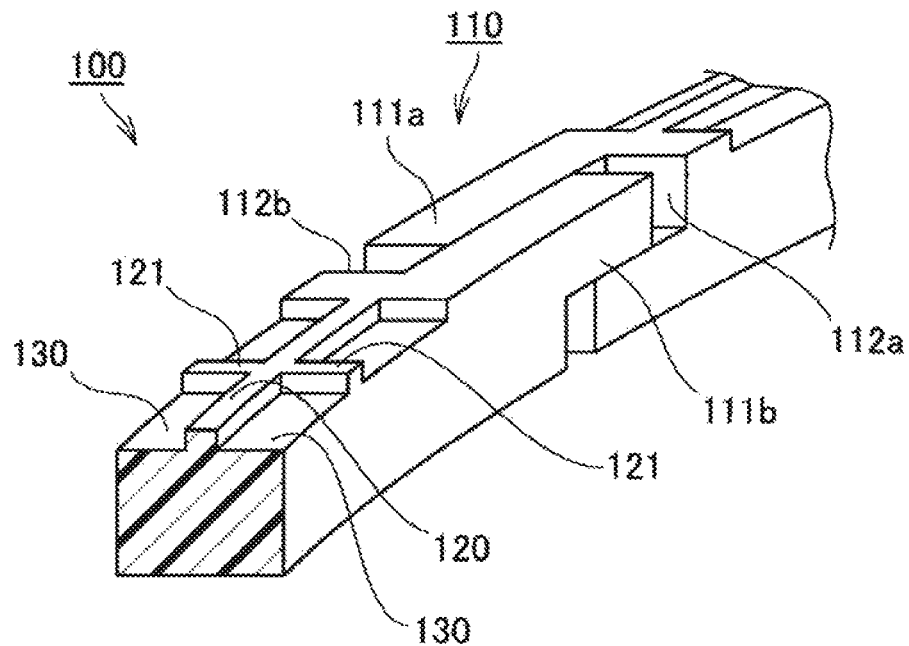
FIG. 6 is a partially broken perspective view of the seal ring according to Example 2 of the present disclosure.
Figure 7:
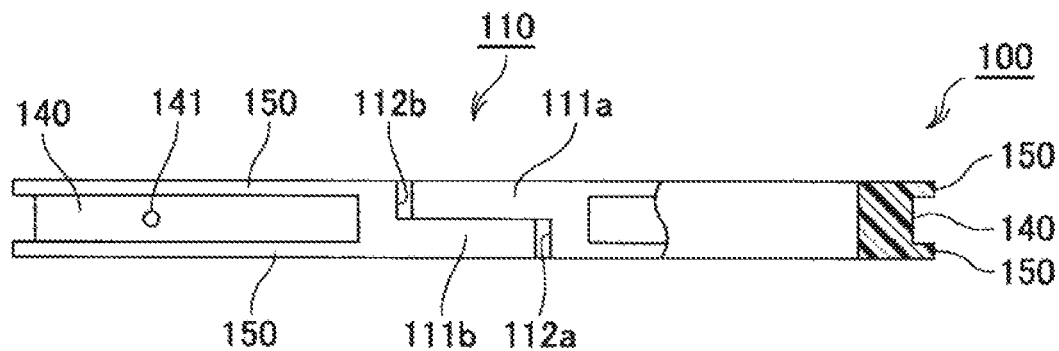
FIG. 7 is a partially broken cross-sectional diagram illustrating a seal ring according to Example 3 of the present disclosure from its outer circumferential surface side.
Figure 8:
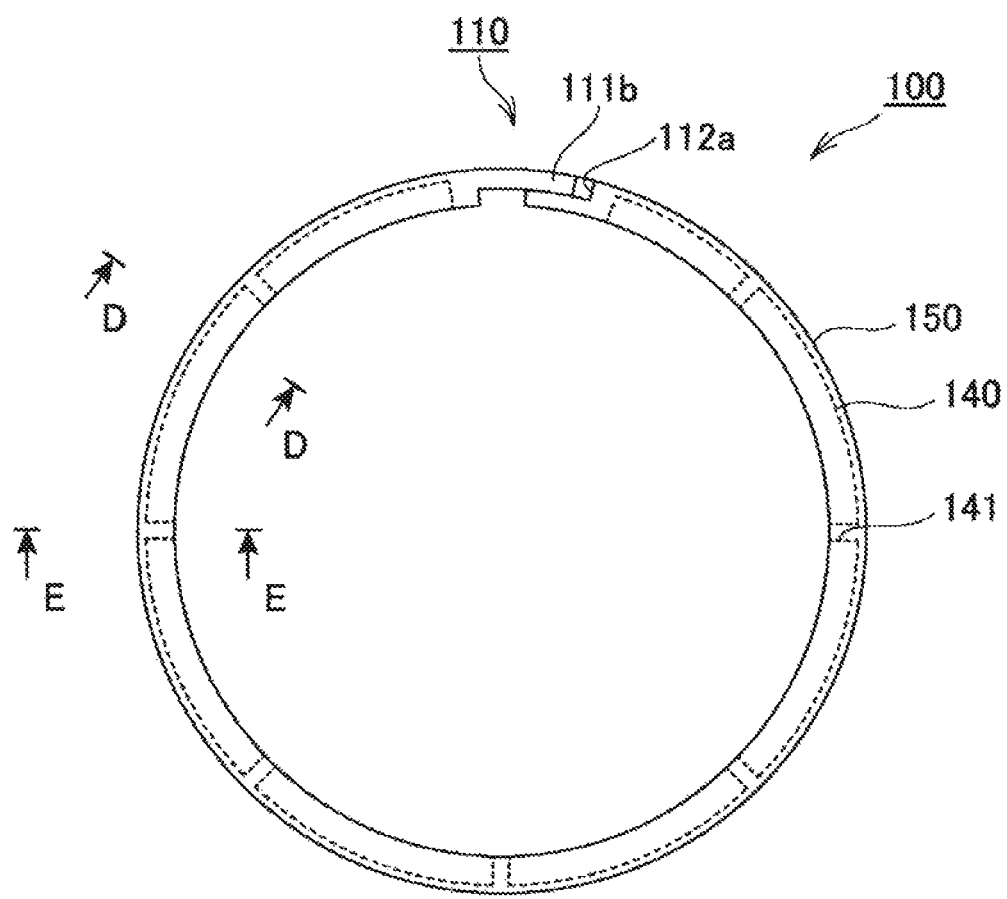
FIG. 8 is a side view of the seal ring according to Example 3 of the present disclosure.
Figure 9:
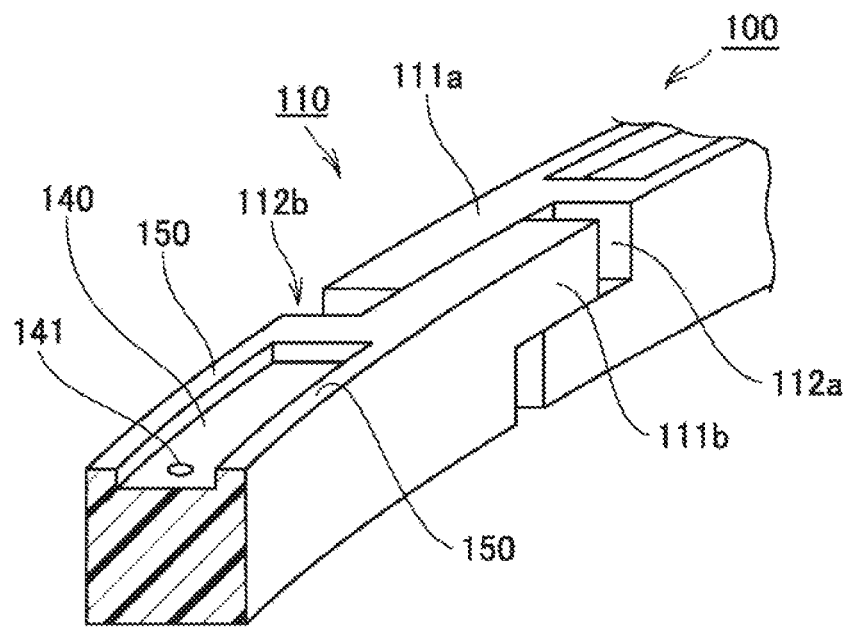
FIG. 9 is a partially broken perspective view of the seal ring according to Example 3 of the present disclosure.

FIGS. 5 and 6 show Example 2 of the present disclosure. The present example illustrates a configuration in which a plurality of ribs are provided within the pair of recessed portions of the configuration illustrated in Example 1. The other configurations and effects of the present example are the same as those of Example 1. Therefore, the same reference numerals are given to the same constituent parts, and descriptions thereof are omitted accordingly.

Similar to above described Example 1, the seal ring 100 of the present example has an abutment joint portion 110, a pair of recessed portions 130, and a protruding portion 120. The abutment joint portion 110, recessed portions 130, and protruding portion 120 have the same configurations as those of the seal ring according to Example 1; thus, descriptions thereof are omitted. Note that, with respect to the abutment joint portion 110, a case where the special step cut is employed is described in the present example, but the type of cut is not limited to this, as already described in Example 1.

In the present example, a plurality of ribs 121 connected to the protruding portion 120 are provided within the pair of recessed portions 130.

The seal ring 100 according to the present example configured as described above can achieve the same effects as those of the seal ring 100 according to Example 1. In addition, since the plurality of ribs 121 are provided in the present example, the rigidity of the seal ring 100 is increased. In particular, the strength against the twisting direction is increased. Therefore, even in an environment where the differential pressure becomes high, deformation of the seal ring 100 can be suppressed and a stable sealing performance is exerted.

Example 3

FIGS. 7 to 12 show Example 3 of the present disclosure. In the present example, basic configuration and its effects are the same as those of Example 1. Therefore, the same reference numerals are given to the same constituent parts, and descriptions thereof are omitted accordingly.

Figure 10:
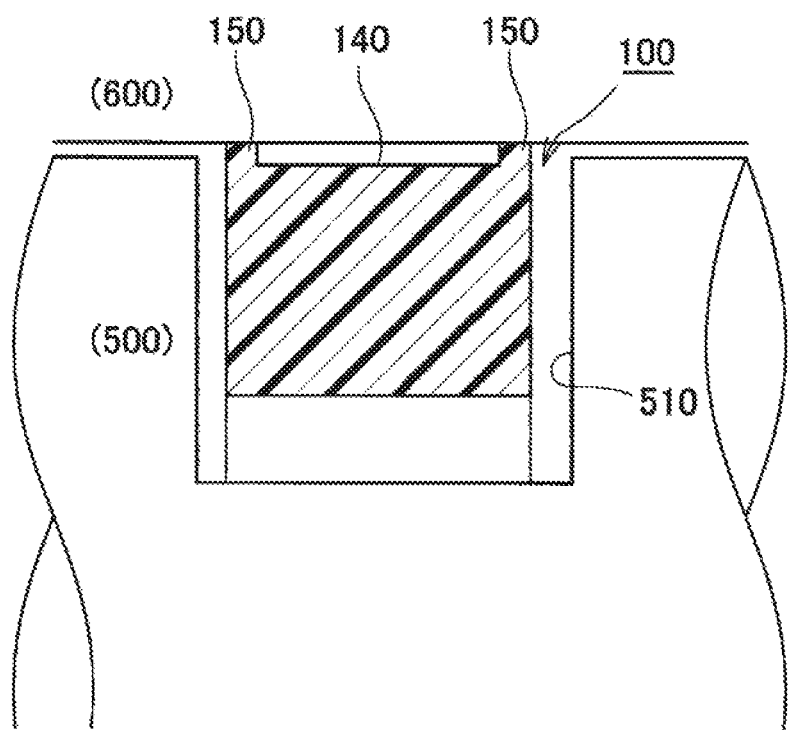
FIG. 10 is a schematic cross-sectional diagram illustrating the seal ring according to Example 3 of the present disclosure in use.
Figure 11:
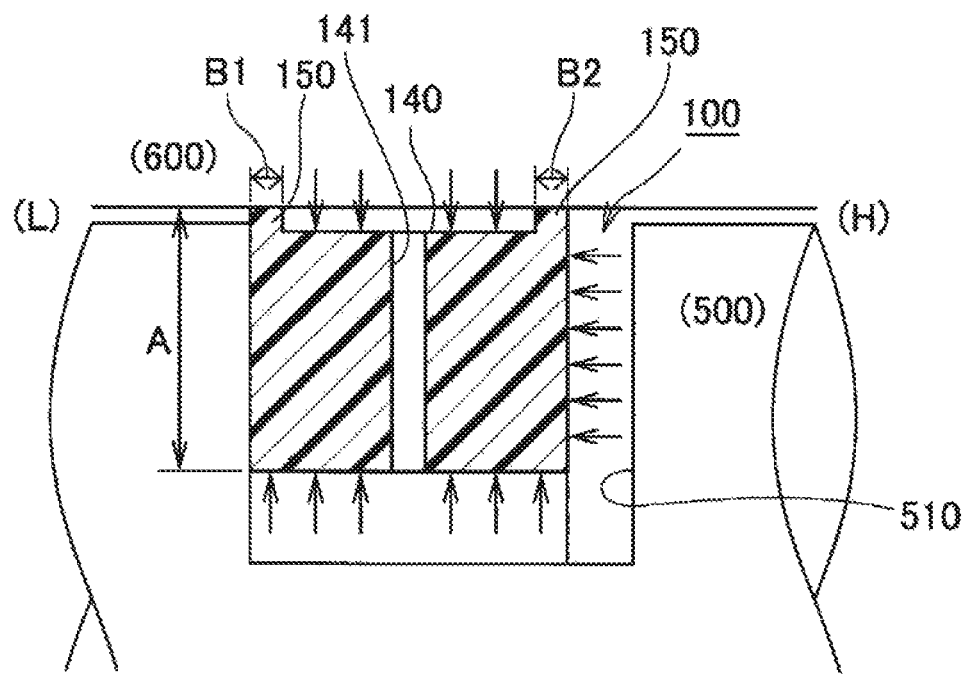
FIG. 11 is a schematic cross-sectional diagram illustrating the seal ring according to Example 3 of the present disclosure in use.
Figure 12:
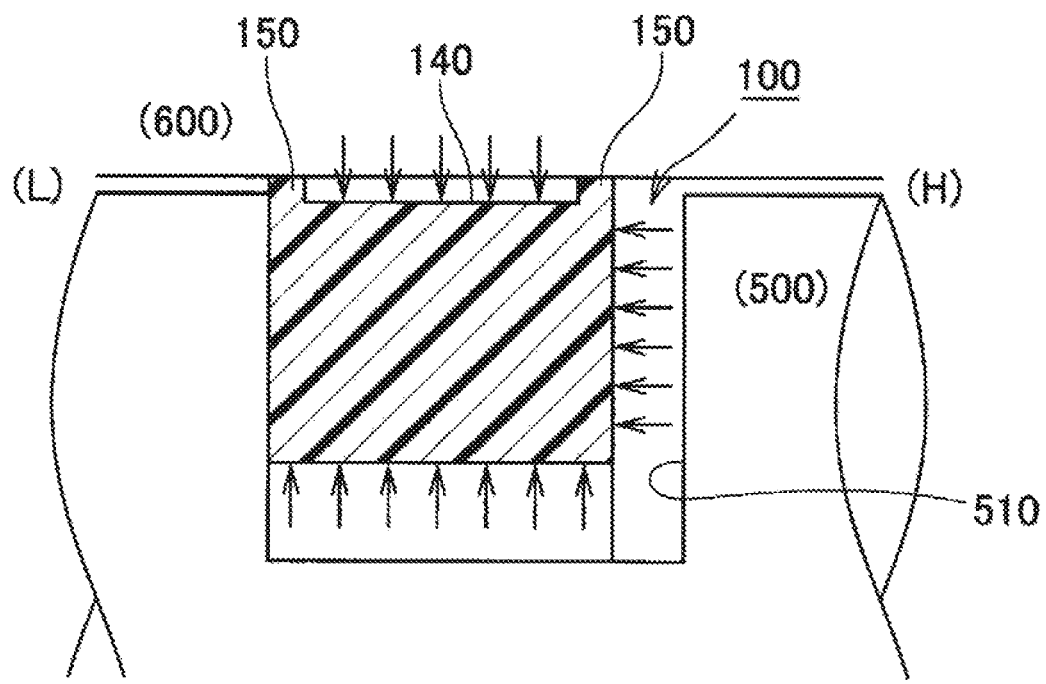
FIG. 12 is a schematic cross-sectional diagram illustrating the seal ring according to Example 3 of the present disclosure in use.
Figure 13:
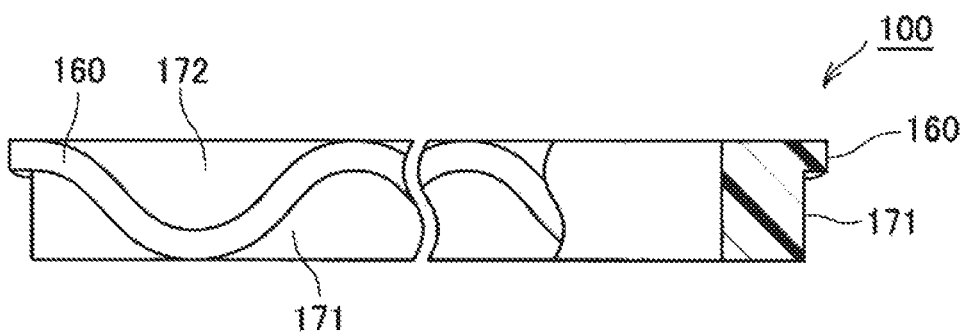
FIG. 13 is a partially broken cross-sectional diagram illustrating a seal ring according to Example 4 of the present disclosure from its outer circumferential surface side.
Figure 14:
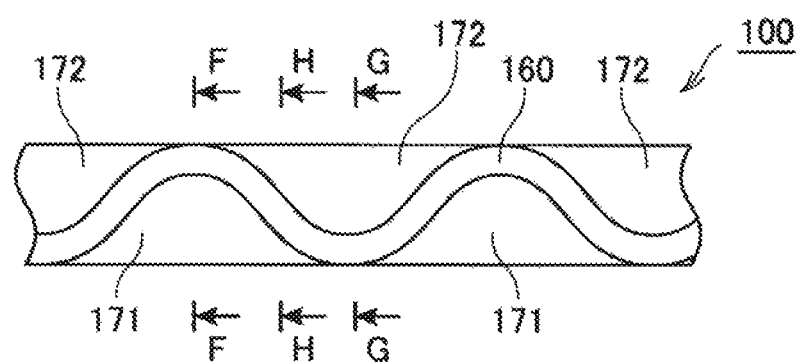
FIG. 14 is a part of a diagram illustrating the seal ring according to Example 4 of the present disclosure from its outer circumferential surface side.

A seal ring 100 according to the present example is mounted in an annular groove 510 provided on an outer circumference of a shaft 500, to seal an annular gap between the shaft 500 and a housing 600 (an inner circumferential surface of a shaft hole of the housing 600 through which the shaft 500 is inserted) that rotate relative to each other. Such configuration enables the seal ring 100 to keep fluid pressure (hydraulic pressure, in the present example) in a region to be sealed that is configured such that the fluid pressure therein changes. In the present example, the fluid pressure in the region on the right side of FIGS. 10 to 12 is configured to change, and the seal ring 100 functions to keep the fluid pressure of the region to be sealed on the right side of the diagram. Note that the fluid pressure in the region to be sealed is low when an engine of an automobile is stopped, and hence no force is applied, whereas the fluid pressure in the region to be sealed becomes high when the engine is started.

The seal ring 100 is made of resin such as polyetheretherketone (PEEK), polyphenylene sulfide (PPS), or polytetrafluoroethylene (PTFE). The perimeter of the outer circumferential surface of the seal ring 100 is shorter than the perimeter of the inner circumferential surface of the shaft hole of the housing 600; hence the seal ring 100 has no interference.

This seal ring 100 has an abutment joint portion 110 at one location in the circumferential direction of the seal ring 100. In addition, on the outer circumferential surface side of the seal ring 100, a recessed portion 140 provided at a center in a width direction and extending in a circumferential direction, and a pair of protruding portions 150 provided on either side of the recessed portion 140 and sliding against the inner circumferential surface of the shaft hole 600 are provided. Moreover, in the seal ring 100, a plurality of through-holes 141 that extends from an inner circumferential surface side to a bottom surface of the recessed portion 140 and is capable of introducing a fluid to be sealed (oil, in this case) from the inner circumferential surface side to the recessed portion 140. A bottom surface of the recessed portion 140 is configured from a surface that is concentric to the inner circumferential surface of the seal ring 100.

Note that, the seal ring 100 according to the present example employs a configuration in which the abutment joint portion 110, the recessed portion 140, the through-hole 141 and the pair of protruding portions 150 are formed on an annular member having a rectangular cross section. However, this is merely a description of the shape of the seal ring 100, and thus this does not indicate that processes to form each of these portions are applied to a raw annular member having a rectangular cross section. Needless to say, each of these portions can be obtained by machining after forming an annular member having a rectangular cross section. However, the recessed portion 140, the through-hole 141 and the pair of protruding portions 150 may be obtained by, for example, machining after forming an annular member having an abutment joint portion 110 in advance; hence, a manufacturing process is not particularly limited.

Similar to above described Example 1, the present example also employs a so-called "special step cut" for the abutment joint portion 110, in which the abutment joint portion 110 is cut into steps as viewed from any of the outer circumferential surface side and both of the wall surface sides. With respect to the abutment joint portion 110, the description thereof has already been described in the case of Example 1; and hence the description is omitted.

The recessed portion 140 is formed over the entire circumference of the seal ring 100, except for the vicinity of the abutment joint portion 110. A section near the abutment joint portion 110 where the recessed portion 140 is not provided is flush with the outer circumferential surfaces of the protruding portions 150. These surfaces form an annular, continuous sealing surface on the outer circumferential surface side of the seal ring 100. In other words, in the region on the outer circumferential surface of the seal ring 100 except for the vicinity of the abutment joint portion 110, only the outer circumferential surfaces of the protruding portions 150 slide against the inner circumferential surface of the shaft hole. Note that in a case where a configuration is employed in which an abutment joint portion 110 is not provided, a pair of protruding portions 150 can be made annular by forming a recessed portion 140 into an annular shape. Accordingly, an annular, continuous sealing surface can be formed with only the outer circumferential surfaces of the pair of protruding portions 150.

With respect to the depth of the recessed portion 140, the shallower it is, the higher the rigidity of the pair of protruding portions 150 becomes. On the other hand, since the pair of protruding portions wears out due to sliding, the depth of the recessed portion 140 becomes shallower with time. Accordingly, if the depth of the recessed portion 140 becomes too shallow, it may not be possible to introduce the fluid. Thus, when setting the initial depth of the recessed portion 140, it is preferred to take both keeping the above described rigidity and maintaining the capability to introduce the fluid after the progression of wear in to consideration. For example, when the thickness of the seal ring 100 is 1.7 mm, the depth of the recessed portion 140 may be set, approximately, between 0.1 mm and 0.3 mm, inclusive.

With respect to the widths of the pair of protruding portions 150, the narrower they are, the lower the torque can be made, but if the widths are made too narrow, their sealing performance and durability may decrease. Therefore, it is desired that the widths be made as narrow as possible to keep the sealing performance and durability, in accordance with the usage environment. Note that, when the entire lateral width of the seal ring 100 is 1.9 mm, for example, each of the widths of the pair of protruding portion 150 may be set, approximately, between 0.3 mm and 0.7 mm, inclusive.

In addition, in the seal ring 100 according to the present example, the summed length of each of the widths of the pair of the protruding portions 150 (equivalent to length of region B1 and length of region B2 in FIG. 11) is made shorter than the distance between the inner circumferential surface of the seal ring 100 and the outer circumferential surface of the protruding portion 150 (equivalent to length of region A in FIG. 11) (see FIG. 4). Note that the length of region B1 and the length of region B2 are made equal.

By setting the relationship between the region A, the regions B1 and B2 as described above, the seal ring 100 can be configured such that the effective pressure-receiving area on its inner circumferential surface side that contributes to a force from the fluid pressure that presses against the inner circumferential surface of the shaft hole becomes smaller than the effective pressure-receiving area on its side surface side that contributes to a force from the fluid pressure that presses against the low-pressure-side side wall surface of the annular groove 510.

<Mechanism of Sealing Device in Use>

The mechanism of the seal ring 100 in use according to the present example is now described with reference in particular to FIGS. 10 to 12. FIG. 10 shows a state in which the engine is stopped and no differential pressure (or almost no differential pressure) is created between left and right regions separated by the seal ring 100; and hence a no-load state is shown. Note that the seal ring 100 in FIG. 10 is equivalent to a sectional view taken along line D-D in FIG. 8. FIGS. 11 and 12 show a state in which the engine is started and the pressure on the right side has become higher than the pressure on the left side separated by the seal ring 100. Note that the seal ring 100 in FIG. 11 is equivalent to a sectional view taken along line E-E in FIG. 8 and the seal ring 100 in FIG. 12 is equivalent to the sectional view taken along line D-D in FIG. 8.

In the no-load state, there is no differential pressure between the left and right regions, and the fluid pressure from the inner circumferential surface does not act. Therefore, the seal ring 100 is separated from the side wall surface of the annular groove 510 on the left side of FIG. 10 and the inner circumferential surface of the shaft hole.

When the engine is started and a differential pressure is generated, the seal ring 100 makes intimate contact with the low-pressure-side (L) side wall surface of the annular groove 510 and slides against the inner circumferential surface of the shaft hole (see FIGS. 11 and 12).

<Advantages of Seal Ring According to Present Example>

In the seal ring 100 according to the present example, when the differential pressure is created between the two sides separated by the seal ring 100, the fluid to be sealed is introduced into the recessed portion 140 through the through-hole 141 from the inner circumferential side of the seal ring 100. Accordingly, even when the fluid pressure becomes high, the fluid pressure in the region provided with this recessed portion 140 acts toward the inner circumferential side. In the present example, the bottom surface of the recessed portion 140 is configured from the surface that is concentric to the inner circumferential surface of the seal ring 100. Therefore, the direction in which the fluid pressure acts from the inner circumferential surface side is opposite to the direction in which the fluid pressure acts from the outer circumferential surface side within the region provided with the recessed portion 140. Note that the arrows shown in FIGS. 11 and 12 represent how the fluid pressure acts on the seal ring 100. For this reason, in the seal ring 100 according to the present example, it becomes possible to suppress an increase of the pressure towards the outer circumferential side of the seal ring 100 due to the increase of the fluid pressure; and hence the sliding torque can be maintained low.

In the seal ring 100 according to the present example, as described above, the sum of the lengths of the region B1 and region B2 shown in FIG. 4 is set to be shorter than the length of the region A. For this reason, as described above, the seal ring 100 can be configured such that the effective pressure-receiving area on its inner circumferential surface side that contributes to a force from the fluid pressure that presses against the inner circumferential surface of the shaft hole becomes smaller than the effective pressure-receiving area on its side surface side that contributes to a force from the fluid pressure that presses against the low-pressure-side side wall surface of the annular groove 510.

Specifically, the region A is the effective pressure-receiving region of when the seal ring 100 is pressed by the fluid to be sealed from the high-pressure-side (H) toward the low-pressure-side (L) in the axial direction. In addition, the area over the entire circumference of the pressure-receiving region A is the effective pressure-receiving area with respect to the axial direction. Furthermore, the regions B1 and B2 are the effective pressure-receiving region of when the seal ring 100 is pressed radially outward by the fluid to be sealed from the inner circumferential surface side toward the outer circumferential surface side. This is because, within the region provided with the recessed portion 140, the fluid pressure acts from either side of the radial direction, thereby offsetting the forces being applied to the seal ring 100 in the radial direction, as described above. Note that the area over the entire circumference of the pressure-receiving regions B1 and B2 is the effective pressure-receiving area with respect to the radial direction.

Therefore, when a differential pressure is created between the two sides of the seal ring 100, in terms of the effective pressure-receiving region (pressure-receiving area) with respect to the seal ring 100, that of in the radially outward direction is smaller than that of in the axial direction. Accordingly, the outer circumferential surfaces of the pair of protruding portions 150 of the seal ring 100 can be caused to slide against the inner circumferential surface of the shaft hole more securely. For this reason, the area of the sliding portion can be made stable regardless of the size of the annular gap between the shaft 500 and the housing 600. Therefore, the sealing performance of the seal ring 100 can be stabilized. In addition, by causing the pair of protruding portions 150 on the outer circumferential surface of the seal ring 100 to slide more securely, the sliding resistance can be reduced, thereby reducing the rotational torque. Moreover, because the outer circumferential surface side of the seal ring 100 slides, a lubricating film (an oil film, in this case) can be created more easily by the fluid to be sealed compared with a seal ring that slides against a side wall surface of an annular groove resulting in further reduction of the sliding torque. This is because, in the case where the outer circumferential surface of the seal ring 100 and the inner circumferential surface of the shaft hole slide against each other, a wedge effect can be exerted in a minute space therebetween.

In addition, according to the present example, the recessed portion 140 is formed over the entire circumference of the seal ring 100, except for the vicinity of the abutment joint portion 110. Therefore, in the present example, as the recessed portion 140 is formed over a wide range of the outer circumferential surface of the seal ring 100, it becomes possible to make the sliding area between the seal ring 100 and the inner circumferential surface of the shaft hole of the housing 600 as narrow as possible, thereby making the sliding torque extremely low.

As described above, because the reduction of the sliding torque can be realized, generation of heat due to the sliding can be suppressed; and hence it becomes possible to appropriately use the seal ring 100 according to the present example even under a high-speed, high-pressure environment. In addition, since the seal ring 100 does not slide against the side surface of the annular groove 510, the shaft 500 can be made of a soft material such as aluminum.

In addition, because the seal ring 100 according to the present example is plane-symmetrical with respect to the width-wise center plane, there is no need to care about the mounting direction when mounting the seal ring 100 into the annular groove 510. In addition, even in an environment where the high-pressure-side (H) and the low-pressure-side (L) alternate, above described advantageous effects can be exerted.

Moreover, in the seal ring 100 according to the present example, because the pair of protruding portions 150 provided on either side of the protruding portion 140 slides against the inner circumferential surface of the shaft hole, the posture of the seal ring 100 can be stabilized. In other words, inclining of the seal ring 100 within the annular groove 510 due to the fluid pressure can be suppressed.

Example 4

FIGS. 13 to 18 show Example 4 of the present disclosure. In the present example, basic configuration and its effects are the same as those of Example 1. Therefore, the same reference numerals are given to the same constituent parts, and descriptions thereof are omitted accordingly.

Figure 16:
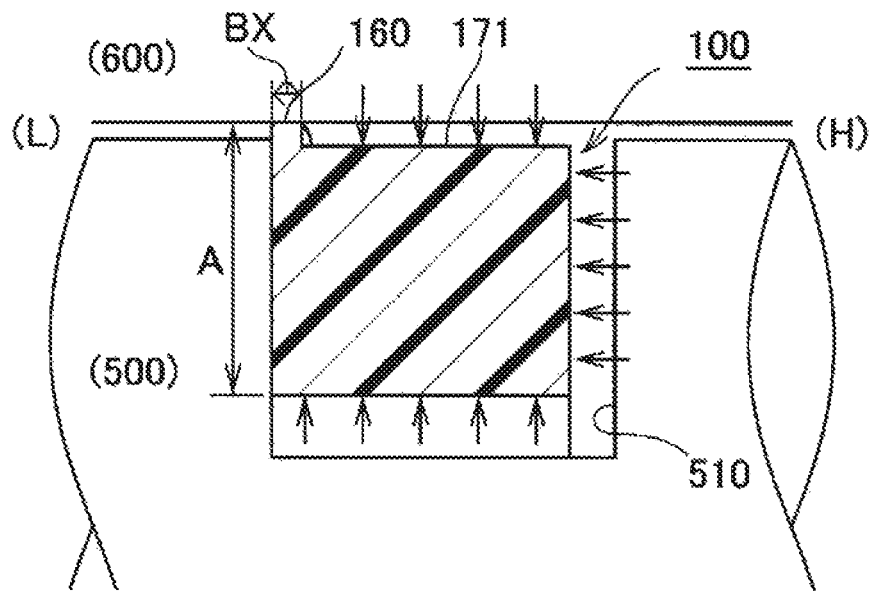
FIG. 16 is a schematic cross-sectional diagram illustrating the seal ring according to Example 4 of the present disclosure in use.
Figure 17:
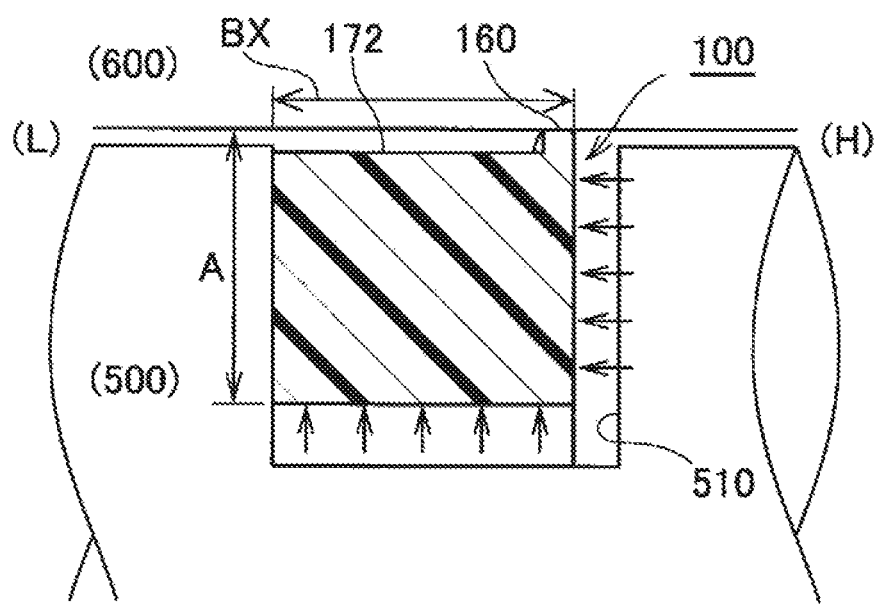
FIG. 17 is a schematic cross-sectional diagram illustrating the seal ring according to Example 4 of the present disclosure in use.
Figure 18:
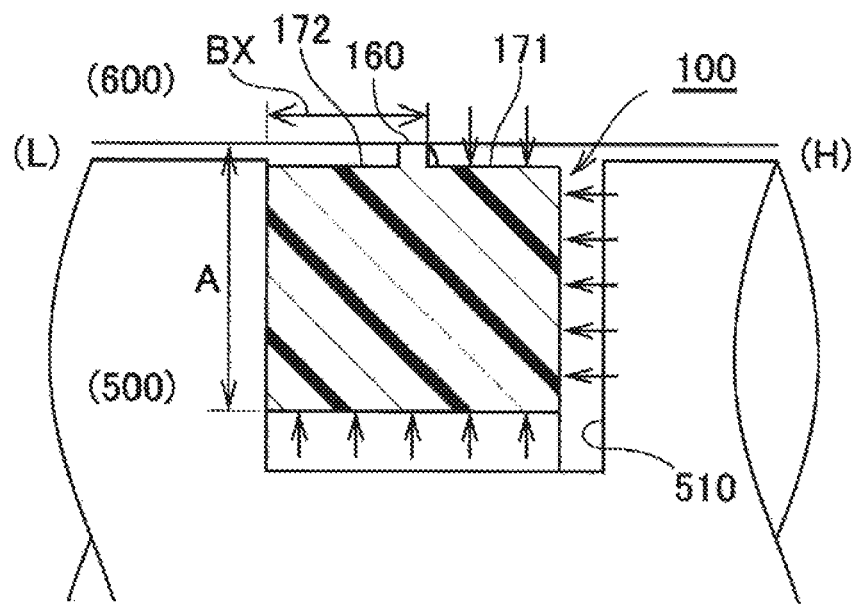
FIG. 18 is a schematic cross-sectional diagram illustrating the seal ring according to Example 4 of the present disclosure in use.
Figure 19:
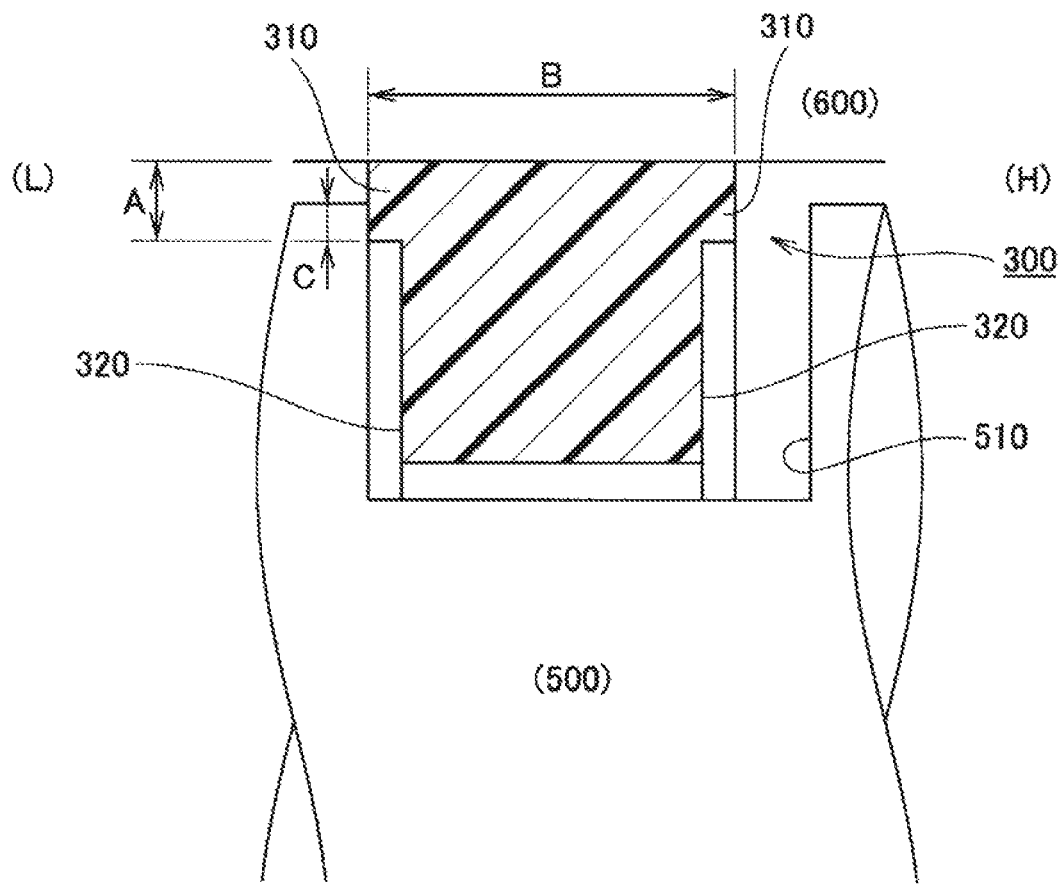
FIG. 19 is a schematic cross-sectional diagram illustrating the seal ring according to the conventional example in use.

A seal ring 100 according to the present example is mounted in an annular groove 510 provided on an outer circumference of a shaft 500, to seal an annular gap between the shaft 500 and a housing 600 (an inner circumferential surface of a shaft hole of the housing 600 through which the shaft 500 is inserted) that rotate relative to each other. Such configuration enables the seal ring 100 to keep fluid pressure (hydraulic pressure, in the present example) in a region to be sealed that is configured such that the fluid pressure therein changes. In the present example, the fluid pressure in the region on the right side of FIGS. 16 to 18 is configured to change, and the seal ring 100 functions to keep the fluid pressure of the region to be sealed on the right side of the diagram. Note that the fluid pressure in the region to be sealed is low when an engine of an automobile is stopped, and hence no force is applied, whereas the fluid pressure in the region to be sealed becomes high when the engine is started.

The seal ring 100 is made of resin such as polyetheretherketone (PEEK), polyphenylene sulfide (PPS), or polytetrafluoroethylene (PTFE). The perimeter of the outer circumferential surface of the seal ring 100 is shorter than the perimeter of the inner circumferential surface of the shaft hole of the housing 600; hence the seal ring 100 has no interference.

This seal ring 100 has an abutment joint portion 110 at one location in the circumferential direction of the seal ring 100. In addition, on the outer circumferential surface side of the seal ring 100, a protruding portion 160 is formed which protrudes toward the outer circumferential surface side and whose surface slides against the inner circumferential surface of the shaft hole 600. The protruding portion 160 is formed such that it extends in a circumferential direction while alternating its position between a high-pressure-side (H) and a low-pressure-side (L) so that it reaches either end surface of the seal ring 100 in a width direction. Specifically, the protruding portion 160 is formed from a wave shape that serpentines in the circumferential direction. In addition, the protruding portion 160 is formed over the entire circumference of the seal ring 100, except for the vicinity of the abutment joint portion 110. Note that, as described hereinbelow, if a configuration in which an abutment joint portion 110 is not provided, the protruding portion 160 will be formed over the entire circumference.

By forming the protruding portion 160 as described above, a plurality of first recessed portions 171 is formed on the high-pressure-side (H) of the outer circumferential surface of the seal ring 100 with spaces in between in the circumferential direction. In addition, a plurality of second recessed portions 172 is formed on the low-pressure-side (L) of the outer circumferential surface of the seal ring 100 with spaces in between in the circumferential direction. The first recessed portion 171 is configured so as to extend from an end portion on the high-pressure-side (H) to a point that does not reach an end portion on the low-pressure-side (L). In addition, the second recessed portion 172 is configured so as to extend from an end portion on the low-pressure-side (L) to a point that does not reach an end portion on the high-pressure-side (H). Bottom surfaces of the first recessed portion 171 and second recessed portion 172 are configured from surfaces that are concentric to the inner circumferential surface of the seal ring 100.

Note that, the seal ring 100 according to the present example employs a configuration in which the abutment joint portion 110, the protruding portion 160, the plurality of first recessed portions 171 and the plurality of second recessed portions 172 are formed on an annular member having a rectangular cross section. However, this is merely a description of the shape of the seal ring 100, and thus this does not indicate that processes to form the abutment joint portion 110, the protruding portion 160, the plurality of first recessed portions 171 and the plurality of second recessed portions 172 are applied to a raw annular member having a rectangular cross section. Needless to say, the abutment joint portion 110, the protruding portion 160, the plurality of first recessed portions 171 and the plurality of second recessed portions 172 can be obtained by machining after forming an annular member having a rectangular cross section. However, the protruding portion 160, the plurality of first recessed portions 171 and the plurality of second recessed portions 172 may be obtained by, for example, machining after forming an annular member having an abutment joint portion 110 in advance; hence, a manufacturing process is not particularly limited.

Similar to above described Example 1, the present example also employs a so-called "special step cut" for the abutment joint portion 110, in which the abutment joint portion 110 is cut into steps as viewed from any of the outer circumferential surface side and both of the wall surface sides. With respect to the abutment joint portion 110, the description thereof has already been described in the case of Example 1; and hence the description is omitted.

Figure 15:
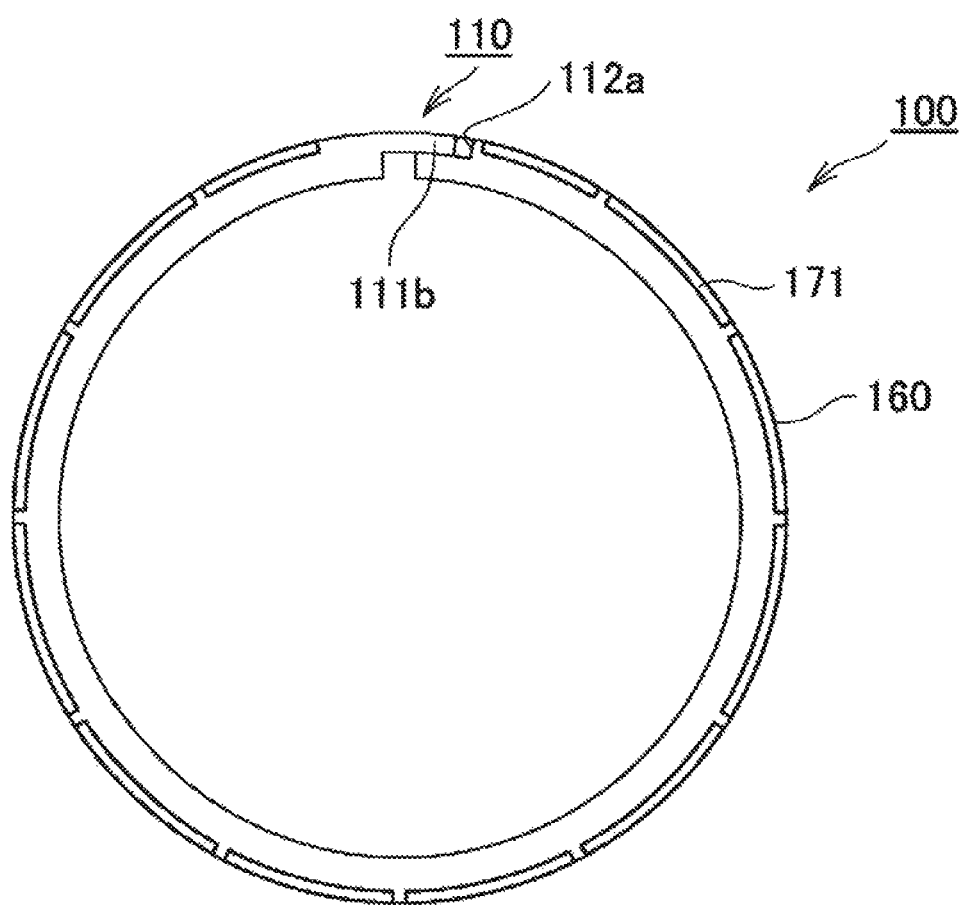
FIG. 15 is a side view of the seal ring according to Example 4 of the present disclosure.

In addition, in a case where a configuration in which the abutment joint portion 110 is provided, it is preferable not to form the first recessed portion 171 or the second recessed portion 172 in the vicinity of the abutment joint portion 110 (see FIG. 15). Note that, in this case, the outer circumferential surface near the abutment joint portion 110 is flush with the outer circumferential surface of the protruding portion 160. These surfaces form an annular, continuous sealing surface on the outer circumferential surface side of the seal ring 100. In other words, in the region on the outer circumferential surface of the seal ring 100 except for the vicinity of the abutment joint portion 110, only the outer circumferential surface of the protruding portion 160 slides against the inner circumferential surface of the shaft hole. Note that in a case where a configuration is employed in which an abutment joint portion 110 is not provided, a protruding portion 160 can be made annular. Accordingly, an annular, continuous sealing surface can be formed with only the outer circumferential surface of the protruding portion 160.

The protruding portion 160 according to the present example is configured from a ling and thin shape; and hence it is configured such that the area on the outer circumferential surface of the seal ring 100 that is occupied by the protruding portion 160 is substantially smaller than the area occupied by the plurality of first recessed portions 171 and second recessed portions 172. The plurality of first recessed portions 171 and second recessed portions 172 are formed over the entire region in the circumferential direction. In other words, the first recessed portions 171 and second recessed portions 172 are formed over the entire region in the circumferential direction except for the vicinity of the abutment joint portion 110 and the portion where the elongate protruding portion 160 is formed. In addition, both side surfaces of the protruding portion 160 according to the present example are configured to be perpendicular to the bottom surfaces of the first recessed portions 171 and the second recessed portions 172.

In addition, with respect to the height of the protruding portion 160 (equal to the depths of the first recessed portion 171 and second recessed portion 172), the lower it is, the higher the rigidity of the portion where the protruding portion 160 is provided. On the other hand, since the protruding portion 160 wears out due to sliding, the depths of the first recessed portions 171 and second recessed portions 172 become shallower with time. Accordingly, if the depth of the first recessed portion 171 becomes too shallow, it may not be possible to introduce the fluid. Thus, when setting the initial height of the protruding portion 160, it is preferred to take both keeping the above described rigidity and maintaining the capability to introduce the fluid after the progression of wear in to consideration. For example, when the thickness of the seal ring 100 is 1.7 mm, the height of the protruding portion 160 may be set, approximately, between 0.1 mm and 0.3 mm, inclusive. In addition, despite the fact that the narrower the width of the protruding portion 160 becomes, the more the torque can be reduced, if the width is made too narrow, its sealing performance and durability may decrease. Therefore, it is desired that the width of the protruding portion 160 be made as narrow as possible to keep the sealing performance and durability, in accordance with the usage environment. Note that, when the entire lateral width (width in the axial direction) of the seal ring 100 is 1.9 mm, for example, the width of the protruding portion 160 may be set, approximately, between 0.3 mm and 0.7 mm, inclusive.

In addition, in the seal ring 100 according to the present example, it is designed such that the area over the entire circumference of a region BX (see FIGS. 16 to 18) between a side surface on one side of the protruding portion 160 and a side surface on another side of the seal ring 100, and the area over the entire circumference of the region between a side surface on another side of the protruding portion 160 and a side surface on one side of the seal ring 100 are smaller than the area over the entire circumference of a region A between the inner circumferential surface of the seal ring 100 and the outer circumferential surface of the protruding portion 160. Note that the region BX can be regarded as the region between the side surface on the high-pressure-side (H) of the protruding portion 160 and the side surface on the low-pressure-side (L) of the seal ring 100, when the seal ring 100 is in use.

By setting the relationship between the region A and the region BX as described above, the seal ring 100 can be configured such that the effective pressure-receiving area on its inner circumferential surface side that contributes to a force from the fluid pressure that presses against the inner circumferential surface of the shaft hole becomes smaller than the effective pressure-receiving area on its side surface side that contributes to a force from the fluid pressure that presses against the low-pressure-side side wall surface of the annular groove 510.

<Mechanism of Sealing Device in Use>

The mechanism of the seal ring 100 in use according to the present example is now described with reference in particular to FIGS. 16 to 18. FIGS. 16 to 18 show a state in which the engine is started and the pressure on the right side has become higher than the pressure on the left side separated by the seal ring 100. Note that the seal ring 100 in FIG. 16 is equivalent to a sectional view taken along line F-F in FIG. 14, the seal ring 100 in FIG. 17 is equivalent to a sectional view taken along line G-G in FIG. 14 and the seal ring 100 in FIG. 18 is equivalent to a sectional view taken along line H-H in FIG. 14.

In a no-load state, there is no differential pressure between the left and right regions, and the fluid pressure from the inner circumferential surface does not act. Therefore, the seal ring 100 is separated from the side wall surface of the annular groove 510 on the left side of FIGS. 16 to 18 and the inner circumferential surface of the shaft hole.

When the engine is started and a differential pressure is generated, the seal ring 100 makes intimate contact with the low-pressure-side (L) side wall surface of the annular groove 510 and slides against the inner circumferential surface of the shaft hole.

<Advantages of Seal Ring According to Present Example>

In the seal ring 100 according to the present example, when the differential pressure is created between the two sides separated by the seal ring 100, the fluid to be sealed is introduced into the first recessed portions 171 on the high-pressure-side (H). Accordingly, even when the fluid pressure becomes high, the fluid pressure in the region provided with the first recessed portions 171 acts toward the inner circumferential side. In the present example, the bottom surfaces of the first recessed portions 171 are configured from the surfaces that are concentric to the inner circumferential surface of the seal ring 100. Therefore, the direction in which the fluid pressure acts from the inner circumferential surface side is opposite to the direction in which the fluid pressure acts from the outer circumferential surface side within the region provided with the first recessed portions 171. Note that the arrows shown in FIGS. 16 to 18 represent how the fluid pressure acts on the seal ring 100. For this reason, in the seal ring 100 according to the present example, it becomes possible to suppress an increase of the pressure towards the outer circumferential side of the seal ring 100 due to the increase of the fluid pressure; and hence the sliding torque can be maintained low.

In the seal ring 100 according to the present example, as described above, the seal ring 100 is configured such that the effective pressure-receiving area on its inner circumferential surface side that contributes to a force from the fluid pressure that presses against the inner circumferential surface of the shaft hole becomes smaller than the effective pressure-receiving area on its side surface side that contributes to a force from the fluid pressure that presses against the low-pressure-side side wall surface of the annular groove 510.

Note that the region A shown in FIGS. 16 to 18 is the effective pressure-receiving region of when the seal ring 100 is pressed by the fluid to be sealed from the high-pressure-side (H) toward the low-pressure-side (L) in the axial direction. In addition, the area over the entire circumference of the pressure-receiving region A is the effective pressure-receiving area with respect to the axial direction. Furthermore, the region BX shown in FIGS. 16 to 18 is the effective pressure-receiving region of when the seal ring 100 is pressed radially outward by the fluid to be sealed from the inner circumferential surface side toward the outer circumferential surface side. This is because, within the region provided with the first recessed portions 171, the fluid pressure acts from either side of the radial direction, thereby offsetting the forces being applied to the seal ring 100 in the radial direction, as described above. Note that the area over the entire circumference of the pressure-receiving region BX is the effective pressure-receiving area with respect to the radial direction.

Therefore, when a differential pressure is created between the two sides of the seal ring 100, in terms of the effective pressure-receiving region (pressure-receiving area) with respect to the seal ring 100, that of in the radially outward direction is smaller than that of in the axial direction. Accordingly, the outer circumferential surface of the protruding portion 160 of the seal ring 100 can be caused to slide against the inner circumferential surface of the shaft hole more securely. For this reason, the area of the sliding portion can be made stable regardless of the size of the annular gap between the shaft 500 and the housing 600. Therefore, the sealing performance of the seal ring 100 can be stabilized. In addition, by causing the protruding portion 160 on the outer circumferential surface of the seal ring 100 to slide more securely, the sliding resistance can be reduced, thereby reducing the rotational torque. Moreover, because the outer circumferential surface side of the seal ring 100 slides, a lubricating film (an oil film, in this case) can be created more easily by the fluid to be sealed compared with a seal ring that slides against a side wall surface of an annular groove resulting in further reduction of the sliding torque. This is because, in the case where the outer circumferential surface of the seal ring 100 and the inner circumferential surface of the shaft hole slide against each other, a wedge effect can be exerted in a minute space therebetween.

In addition, according to the present example, the first recessed portions 171 and the second recessed portions 172 are formed over the entire circumference of the seal ring 100, except for the vicinity of the abutment joint portion 110. Therefore, in the present example, as the first recessed portions 171 and the second recessed portions 172 are formed over a wide range of the outer circumferential surface of the seal ring 100, it becomes possible to make the sliding area between the seal ring 100 and the inner circumferential surface of the shaft hole of the housing 600 as narrow as possible, thereby making the sliding torque extremely low.

As described above, because the reduction of the sliding torque can be realized, generation of heat due to the sliding can be suppressed; and hence it becomes possible to appropriately use the seal ring 100 according to the present example even under a high-speed, high-pressure environment. In addition, since the seal ring 100 does not slide against the side surface of the annular groove 510, the shaft 500 can be made of a soft material such as aluminum.

Moreover, because the seal ring 100 according to the present example is plane-symmetrical with respect to the width-wise center plane, there is no need to care about the mounting direction when mounting the seal ring 100 into the annular groove 510. In addition, even in an environment where the high-pressure-side (H) and the low-pressure-side (L) alternate, above described advantageous effects can be exerted.

Moreover, the protruding portion 160 formed on the outer circumferential surface of the seal ring 100 according to the present example is formed such that it extends in the circumferential direction while alternating its position between the high-pressure-side (H) and the low-pressure-side (L). Accordingly, the point of the outer circumferential surface of the seal ring 100 that slides against the shaft hole of the housing 600 will not be concentrated to the high-pressure-side (H) or the low-pressure-side (L). Therefore, it becomes possible to suppress the inclining of the seal ring 100 within the annular groove 510; and hence the mounting state of the seal ring 100 can be stabilized. Note that in the present example, the protruding portion 160 is formed such that it extends in the circumferential direction while alternating its position between the high-pressure-side (H) and the low-pressure-side (L) so as to reach the either end surface of the seal ring 100. Therefore, it becomes possible to effectively suppress the point of the outer circumferential surface of the seal ring 100 that slides against the shaft hole of the housing 600 from being concentrated to the high-pressure-side (H) or the low-pressure-side (L).

Note that in the present example, a configuration is described in which the protruding portion 160 is formed from a wave shape that serpentines in the circumferential direction. With respect to the protruding portion, however, it can be configured from a rectangular wave shape that extends in the circumferential direction or a triangular wave shape that extends in the circumferential direction.

REFERENCE SIGNS LIST

100: seal ring
110: abutment joint portion
111a: first engagement raised portion
111b: second engagement raised portion
112a: first engagement depressed portion
112b: second engagement depressed portion
120, 150, 160: protruding portion
121: rib
130, 140: recessed portion
171: first recessed portion
172: second recessed portion
500: shaft
510: shaft hole
600: housing

The invention claimed is:

1. A rotary shaft seal assembly, comprising:
a housing having a shaft hole;
a shaft having an annular groove provided on an outer circumference of the shaft, the shaft during operation being rotatable 360 degrees relative to the housing;
a one-piece, split seal ring having an abutment joint portion including two overlapping ends seals an annular gap between the shaft and the housing to keep fluid pressure in a region to be sealed that is configured such that the fluid pressure therein changes,
the one-piece, split seal ring making intimate contact with a low-pressure-side side wall surface of the annular groove and sliding against an inner circumferential surface of the shaft hole of the housing through which the shaft is inserted, the one-piece, split seal ring having a pair of side surfaces on a first side and a second side thereof,
wherein a pair of recessed portions are formed on an outer circumferential surface side of the one-piece, split seal ring on each side in a width direction and extending in a circumferential direction, and the outer circumferential surface side of the one-piece, split seal ring including a protruding portion disposed between the pair of recessed portions, the protruding portion having a pair of side surfaces on a first side and a second side thereof,
a first distance between the side surface on the first side of the protruding portion and the side surface on the second side of the one-piece, split seal ring, and a second distance between the side surface on the second side of the protruding portion and the side surface on the first side of the one-piece, split seal ring are set to be shorter than a third distance between an inner circumferential surface of the one-piece, split seal ring and an outer circumferential surface of the protruding portion when the fluid pressure acts on the one-piece, split seal ring, thereby
configuring an effective pressure-receiving area on an inner circumferential surface side that contributes to a force from the fluid pressure that presses against the inner circumferential surface of the shaft hole to become smaller than an effective pressure-receiving area on a side surface side that contributes to a force from the fluid pressure that presses against the low-pressure-side side wall surface of the annular groove,
wherein the pair of recessed portions of the outer circumferential surface of the one-piece, split seal ring each includes a plurality of ribs connected to the protruding portion and extending to the pair of side surfaces of the one-piece, split seal ring.

2. The rotary shaft seal assembly according to claim 1, wherein the two ends of the abutment joint portion each include a raised portion and a depressed portion wherein the raised portion of each of the two ends is received in the depressed portion of the other of the two ends.

* * * * *